(12) United States Patent
Burns et al.

(10) Patent No.: US 7,893,887 B2
(45) Date of Patent: Feb. 22, 2011

(54) ANTENNA FOR RFID DEVICE READER, AND METHOD OF USE

(75) Inventors: Gary P. Burns, Rockford, MI (US); Michael J. Isabell, Grand Rapids, MI (US)

(73) Assignee: Avery Dennison Corporation, Pasadena, CA (US)

( * ) Notice: Subject to any disclaimer, the term of this patent is extended or adjusted under 35 U.S.C. 154(b) by 996 days.

(21) Appl. No.: 11/691,808

(22) Filed: Mar. 27, 2007

(65) Prior Publication Data

US 2008/0238683 A1  Oct. 2, 2008

(51) Int. Cl.
*H01Q 21/20* (2006.01)

(52) U.S. Cl. ...................... 343/799; 343/793

(58) Field of Classification Search .............. 343/797, 343/793, 799, 815, 817
See application file for complete search history.

(56) References Cited

U.S. PATENT DOCUMENTS

| | | | |
|---|---|---|---|
| 6,104,291 A | 8/2000 | Beauvillier et al. | |
| 6,593,853 B1 | 7/2003 | Barrett et al. | |
| 7,365,687 B2 * | 4/2008 | Borleske et al. | 343/700 MS |
| 2001/0035844 A1 * | 11/2001 | Reece et al. | 343/810 |
| 2003/0090431 A1 * | 5/2003 | Gottl | 343/797 |
| 2007/0152901 A1 * | 7/2007 | Hockey et al. | 343/793 |
| 2008/0111757 A1 * | 5/2008 | Bisiules et al. | 343/799 |

FOREIGN PATENT DOCUMENTS

| | | |
|---|---|---|
| DE | 102004019071 | 11/2005 |
| JP | 11138941 | 5/1999 |
| WO | 2005102717 | 11/2005 |

* cited by examiner

*Primary Examiner*—HoangAnh T Le

(57) ABSTRACT

An antenna for use with an RFID device reader includes a metallic plate and multiple antenna elements attached to the metallic plate. The antenna elements may consist of two prongs each, with the prongs of each element arrayed in a diagonal configuration, and with the two prongs forming an X-shape. Each of the prongs may include a pair of L-shape prong parts that are coupled together by an electrical element connecting the corners of the L-shape prong parts. The distal ends of all of the prong parts of the antenna elements may together form a substantially square shape. Each of the antenna elements may be coupled to a single conductor, for connection to an RFID reader. The connection may be through a suitable standard coupling, such as a coaxial cable with a suitable connector.

20 Claims, 3 Drawing Sheets

ANTENNA FOR RFID DEVICE READER, AND METHOD OF USE

BACKGROUND OF THE INVENTION

1. Technical Field of the Invention

The invention relates to the field of RFID reader antennas, and to devices and methods for communicating with RFID tags and labels.

2. Description of the Related Art

RFID devices, such as RFID tags and RFID labels, have been increasing in their use and applications. RFID readers have been used to detect RFID devices for a variety of purposes, including inventory and tracking purposes.

With the increased use of RFID devices, RFID have begun to be used in a wider variety of circumstances and environments. This has presented a problem in that RFID antennas for use with RFID readers have typically had to be optimized for use in certain narrow classes of environments or conditions. This has resulted in a multiplicity of antenna devices, and a need for selecting antennas for use in whatever particular application is desired.

In view of the foregoing, it would be appreciated that improvements in the field of RFID readers would be desirable.

SUMMARY OF THE INVENTION

According to an aspect of the invention, an RFID antenna for use with a read-transmit RFID reader, wherein the antenna includes: a planar metallic back plate; a pair of antenna elements attached to the back plate, wherein the antenna elements each include a pair of antenna prongs, each of the prongs in turn including a pair of prong parts that are attached to the plate, and a tuned electrical element between the prong parts; and an electrical coupling for connecting the antenna elements to the read-transmit RFID reader. The antenna provides magnetic coupling at a range greater than 1 wavelength at an RFID frequency.

According to another aspect of the invention, a method of RFID device communication includes sending signals at an RFID frequency through the antenna, from a read-transmit RFID reader coupled to the antenna. The antenna includes: a planar metallic back plate; a pair of antenna elements attached to the back plate, wherein the antenna elements each include a pair of antenna prongs, each of the prongs in turn including a pair of prong parts that are attached to the plate, and a tuned electrical element between the prong parts; and an electrically coupling for connecting the antenna elements to the read-transmit RFID reader. The antenna provides magnetic coupling at a range greater than 1 wavelength at the RFID frequency.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily to scale.

DETAILED DESCRIPTION

An antenna for use with an RFID device reader includes a metallic plate and multiple antenna elements attached to the metallic plate. The antenna elements may consist of two prongs each, with the prongs of each element arrayed in a diagonal configuration, and with the two prongs forming an X-shape. Each of the prongs may include a pair of L-shape prong parts that are coupled together by an electrical element connecting the corners of the L-shape prong parts. The distal ends of all of the prong parts of the antenna elements may together form a substantially square shape. Each of the antenna elements may be coupled to a single conductor, for connection to an RFID reader. The connection may be through a suitable standard coupling, such as a coaxial cable with a suitable connector. The back plate of the antenna may be made of aluminum and the prongs of the antenna elements may be made of aluminum, such as cast aluminum.

In contrast with other antennas used with RFID readers to communicate at RFID reader frequencies, the antenna provides more versatile operation, including having a much greater range for magnetic coupling. While magnetic coupling using standard antennas for RFID readers is limited to a distance of about one wavelength of the RFID frequency signal, magnetic coupling using the present antenna may be several times a wavelength of the RFID frequency. The antenna provides an inexpensive way of coupling any various RFID readers for communicating with various types of RFID devices in various types of environments.

Figure 1:
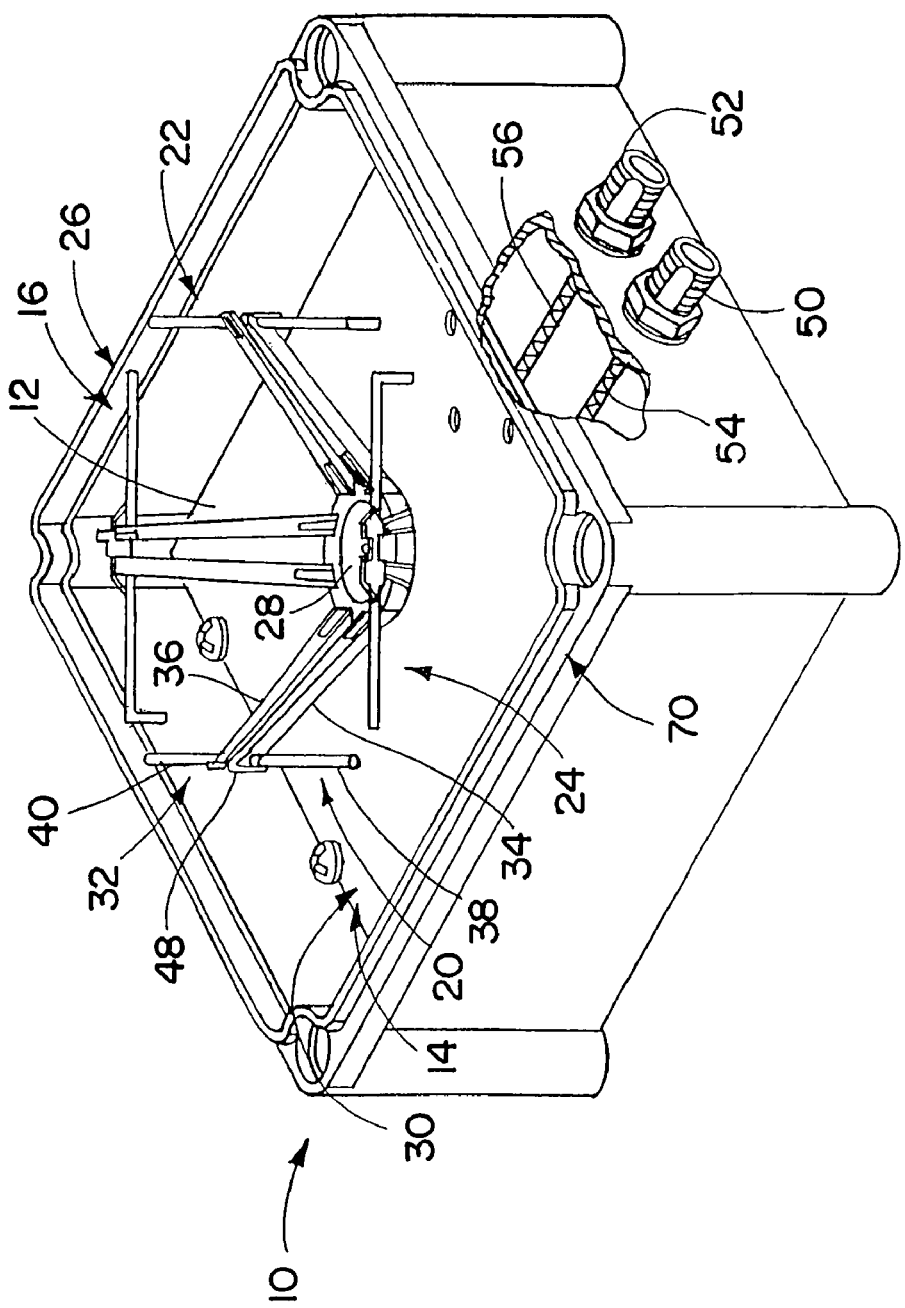
FIG. 1 is an oblique partial-cutaway view of an RFID antenna in accordance with the present invention.
Figure 2:
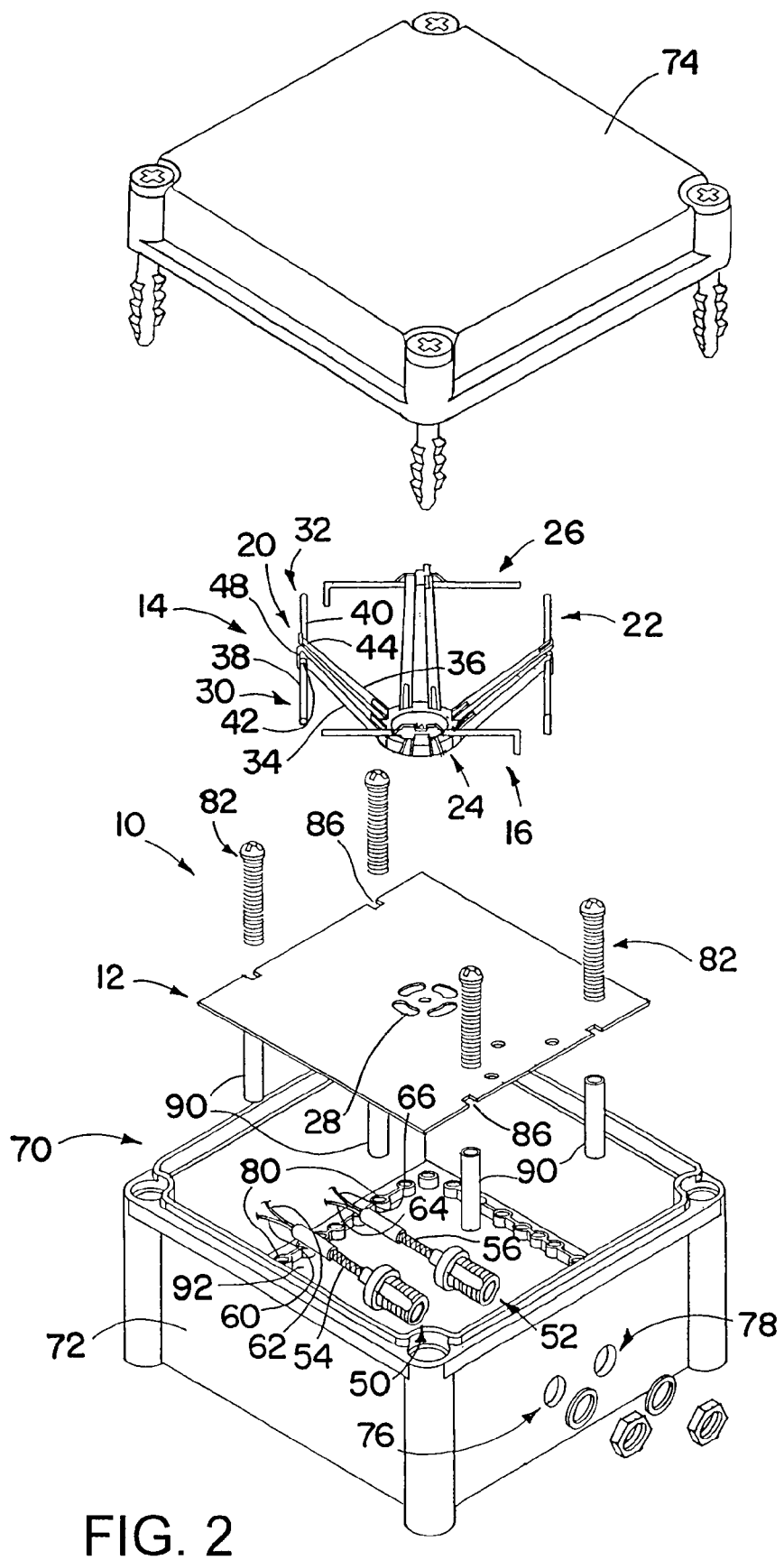
FIG. 2 is an exploded view of the RFID antenna of FIG. 1.

Referring initially to FIGS. 1 and 2, an antenna 10 includes a back plate 12 and antenna elements 14 and 16 attached to the back plate 12. The first antenna element 14 includes a pair of antenna prongs 20 and 22. The second antenna element 16 also includes a pair of antenna prongs 24 and 26. The antenna prongs 20, 22, 24, and 26 are all attached to the back plate 12 at a central attachment region 28 in the middle of the back plate 12. The prongs 20-26 may be symmetrically evenly spaced about a circumference of the central attachment region 28. The prongs 20-26 of each of the antenna elements 14 and 16 are diametrically opposed to one another. That is, the antenna prongs 20 and 22 are located on a diagonal, diametrically opposed to one another across the central region 28. Likewise, the antenna prongs 24 and 26 are diagonally oriented, diametrically opposed from one another across the central attachment region 28. The antenna elements 14 and 16 are thus configured in an X-shape, with the antenna prongs 20 and 22 forming one line of the X, and the antenna prongs 24 and 26 forming the other line of the X. Traveling circumferentially about the central attachment region 28, the antenna prongs 20 and 22 of the first antenna element 14 alternates with the antenna prongs 24 and 26 of the second antenna element 16.

Each of the antenna prongs 20-26 may be substantially identical to one another. Details are now described with regard to one of the antenna prongs, the antenna prong 20, but it will be appreciated that similar details may be present for other the antenna prongs 22-26. The antenna prong 20 includes a pair of antenna prong parts 30 and 32. The antenna prong parts 30 and 32 are L-shape parts, with respective proximal leg sections 34 and 36 attached to the back plate 12, and with respective distal bent ends 38 and 40. The ends 38 and 40 are free ends, unconnected to other parts of the antenna 10 except at corners 42 and 44 between the free ends 38 and 40 and the proximal legs 34 and 36. The distal ends 38 and 40 of the prong 20 each may have a substantially circular cross-section.

The antenna prong 20 forms a T-shape, with the proximal legs 34 and 36 running next to one another from their attachment points to the central attachment region 28, and with the distal ends 38 and 40 co-linear with one another, directed away from one another from the corners 42 and 44. The proximal legs 34 and 36 may be directed slightly toward one another as they move from their attachment points to the back plate 12, to the corners 42 and 44. This allows connection of an electrical element 48 to the antenna prong part 32. The electrical element 48 may be a tuned electrical element selected for the intended RFID frequency of use for the antenna 10. For example, the electrical element 48 may be a resistor selected for good performance at the intended RFID frequency of operation for the antenna 10. The electrical element 48 provides an electrical connection between the two antenna prong parts 30 and 32 of the antenna prong 20.

The antenna prong parts 30 and 32 are cast aluminum parts. The antenna prong parts 30 and 32 may also be substantially mirror images of one another. The distal legs 34 and 36 may have channels therein, one of which receives an electrical cable for coupling the antenna prong 20 to an RFID reader. The channel in the distal leg 34 and 36 may received a cable therein, which may be coupled to the material of the antenna prong part 30 or 32 by a suitable connection method, for example soldering.

The proximal legs 34 and 36 are tilted out and away from the back plate 12. This places the distal ends 38 and 40 a distance spaced away from the back plate 12. Together, the distal ends of all of the antenna prongs 20-26 form a co-planar, substantially square shape element substantially parallel to and spaced away from the back plate 12. The antenna prongs 20 and 22 of the first antenna element 14 make up two opposite sides of the square shape, and the antenna prongs 24 and 26 of the second antenna element 16 make up the other two opposite sides of the square antenna.

The back plate 12 may be square as well. The square shape of the distal ends of the antenna prongs 20-26 may be rotated approximately 45 degrees relative to the orientation of the antenna back plate 12.

The antenna 10 includes an electrical connector, coaxial connectors 50 and 52 in the illustrated embodiment, for making the connection between the antenna elements 14 and 16, and an RFID reader. Coaxial cables 54 and 56 are coupled to the individual coaxial connectors 50 and 52. The cable 54 is connected to a pair of cables 60 and 62, which in turn are connected to the individual antenna prongs 20 and 22 of the first antenna element 14. The cable 56 is connected to cables 64 and 66, which in turn are coupled to the individual antenna prongs 24 and 26 of the second antenna element 16.

Each of the cables 60-66 has its two conductors connected to respective of the prong parts of the antenna prongs. For example, the outer conductor of one of the coaxial cables 60-66 is attached to the antenna prong part 30, while the central conductor of the same coaxial conductor is attached to the electrical element 48, which in turn is attached to the other antenna prong part 32.

The operative parts of the antenna 10 are located in a housing 70. The housing 70 includes a base 72, and a cover 74 that fits onto and engages the base 72. The base 72 and the cover 74 may be made of plastic or another suitable material. The cover 74 and the base 72 may be sealingly engaged with one another, and may be adhesively joined together. The housing 70 may be sealed to prevent ingress of dust or other contaminants into the interior of the housing 70.

Openings 76 and 78 are provided in the base 72 to allow access to the coaxial connectors 50 and 52. The coaxial connectors 50 and 52 may be used to provide connection to a RFID reader, using a standard coaxial cable or other suitable electrical connector.

The working parts of the antenna element 10 are mechanically coupled to the base 72 using screw holes 80 in the base 72. A set of screws 82 pass into four notches 86, pairs of which are in opposite sides of the antenna plate 12. The screws 82 are placed in the notches 86 and are run through hollow cylindrical spacers 90, before engaging the screw holes 80. The spacers 90, which may be made of copper, aid in holding the antenna plate 12 spaced apart from a bottom wall 92 of the base 72.

The antenna plate 12 and the antenna prongs 20-26 may be made of suitable conductive materials. The antenna plate 12 may be made of aluminum. The antenna prongs 20-26 may be made also of aluminum, and may be cast aluminum parts. The antenna plate 12 may be 10×10 cm, although it will be appreciated that variety of other sizes for the antenna plate 12 may be possible.

The antenna prongs 20-26 may be mechanically coupled to the central connection region 28 of the antenna plate 12 by any of a variety of suitable means. Such suitable means may include passing portions of the antenna prongs 20-22 through holes in the antenna plate 12, and crimping the antenna prongs 20-22 to the antenna plate 12. The antenna plate 12 serves to reflect radio waves that hit it.

As noted above, the antenna 10 may be configured to operate at a suitable RFID frequency. An "RFID frequency," as used herein, is defined as a frequency that which communication is commonly conducted with RFID devices. One example of an RFID frequency is the frequency range of 860-960 MHz, and more narrowly in the range 902-928 MHz, which is typical of the frequency used for high-frequency RFID device communications. Another example of an RFID frequency is the range of frequencies around 13.56 MHz. A further example is the range of frequencies around 125 kHz, such as 125-134 kHz. Other examples of RFID frequencies include 433 MHz, 2.45 GHz, and 5.8 GHz.

The antenna 10 may provide better and overall more versatile performance than prior art antennas. The antenna 10 may provide far-field electrical performance that is comparable to that of prior art antennas. In addition, the antenna 10 may provide magnetic field performance that has a much greater range than that of comparable prior art RFID antennas. In prior art antennas, usable (readable) magnetic field performance may be limited to about one wavelength of the RFID frequency utilized. In the antenna 10, by contrast, the RFID frequency may be multiples of the wavelength of the RFID frequency utilized. Whereas the magnetic field re-distance of prior art RFID antennas may be limited to approximately 13 inches (30 cm), the magnetic field readable distance of the antenna 10 may be between 1 and 2 meters. In other words, the 1-2 foot UHF magnetic field range of prior antennas is eclipsed by the 4-6 foot magnetic field range of the antenna 10. The increased magnetic field range of the antenna 10, relative to other RFID antennas, may be due to the use of multiple antenna elements, such as the antenna elements 14 and 16, in the antenna 10. The use of multiple elements effectively doubles or triples the magnetic field range, in UHF RFID frequencies, of the antenna 10.

The antenna 10 provides a variety of potential ways of detecting RFID devices. It provides a full potential for electrical field coupling between an RFID reader and RFID devices. In addition it provides enhanced magnetic field read distance for coupling with RFID devices. This allows the RFID antenna 10 to be used in a variety of circumstances. Even when RFID devices are in an environment that usually resist detectability using electric field coupling, for example environments involving liquids or coupling to metal objects, such as in RFID devices coupled to cases of soft drink cans, the antenna 10 may provide acceptable read performance. The enhancement in read performance may involve an enhanced range of readability, and/or enhanced readability within a given range. The magnetic throw (read distance using magnetic coupling) may be greatly enhanced using the antenna 10, relative to prior art RFID antennas.

Magnetic coupling, as the term is used herein, refers to transfer of energy primarily by interaction of magnetic fields. Magnetic coupling is used in contrast to primarily electrical coupling by interaction of electrical fields. Near-field coupling relies primarily on magnetic coupling. Magnetic coupling falls off in strength rapidly with range. This limits the effective near-field magnetic coupling range to about 1-2 wavelengths of radiation. Far-field radiation for coupling beyond 2 wavelengths has both electric and magnetic components.

Figure 3:
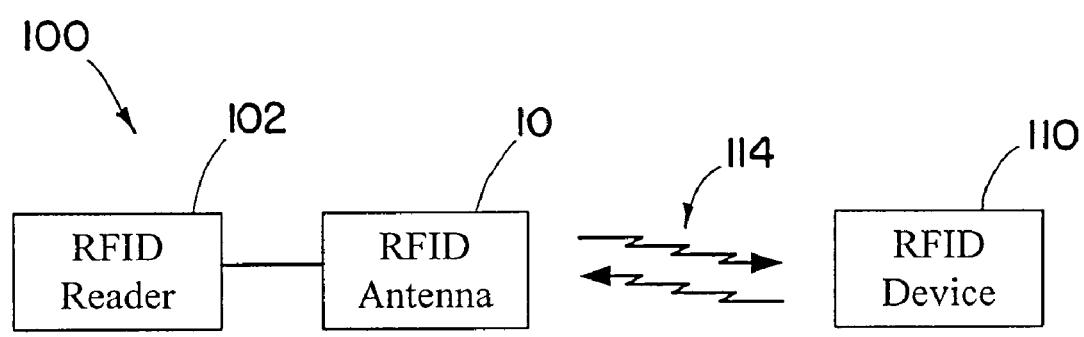
FIG. 3 is a schematic diagram of an RFID communication system utilizing the RFID antenna of FIGS. 1 and 2.

Turning now to FIG. 3, an RFID communication system 100 includes a read-transmit RFID reader 102 operatively coupled to the antenna 10. The read-transmit reader 102 may be any of a variety of commercially-available read-transmit RFID readers, such as the Impinge CSL461 reader, or the SIRIT INFINITY 2.8 reader. As described above, the reader 102 may be coupled to the antenna via a coaxial cable 104.

The combination of the reader 102 and the antenna 10 may communicate with one or more RFID devices 110 by use of RFID signals 114. The RFID signals 114 are signals sent at an RFID frequency, with the signals originating in the RFID reader 102 and being transmitted by the antenna 10. The RFID devices are active, passive, or semi-passive RFID labels or tags (collectively referred to as "RFID devices") that either send signals of their own or reflect signals sent by the combination of the RFID reader 102 and the antenna 10. The RFID devices 110 may be in any of a variety of environments, being attached to or otherwise coupled to conductive or non-conductive, liquid and/or solid, products or other devices. The RFID devices 110 may be used to track objects they are coupled to for any of a variety of purposes, for example for inventory or tracking purposes.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An RFID reader antenna for use with a read-transmit RFID reader, wherein the antenna includes:
   a planar metallic back plate;
   a pair of antenna elements attached to the back plate, wherein the antenna elements each include a pair of antenna prongs, each of the prongs in turn including a pair of prong parts that are attached to the plate, and a tuned electrical element between the prong parts; and
   at least one electrical coupling for connecting the antenna elements to the read-transmit RFID reader;
   wherein the antenna provides magnetic coupling at a range greater than 1 wavelength at an RFID frequency.

2. The RFID antenna of claim 1, wherein the antenna provides magnetic coupling at a range of at least 1 meter, at the RFID frequency.

3. The RFID antenna of claim 1, wherein the antenna provides magnetic coupling at a range of between 1 to 2 meters, at the RFID frequency.

4. The RFID antenna of claim 1, wherein the RFID frequency is a frequency from 902 MHz to 928 Mhz.

5. The RFID antenna of claim 1, wherein the RFID frequency is 13.56 MHz.

6. The RFID antenna of claim 1, wherein the electrical element is tunes the antenna to operate at the RFID frequency.

7. The RFID antenna of claim 1, wherein the prongs of each of the antenna elements are diagonally arrayed, with the prongs of the elements together arrayed in an X shape.

8. The RFID antenna of claim 1, wherein the prong parts each have bent ends.

9. The RFID antenna of claim 8, wherein the prong parts each make an angled connection with a central attachment region of the back plate.

10. The RFID antenna of claim 8, wherein the bent ends of the prong parts together form a square shape.

11. The RFID antenna of claim 1, wherein the antenna prongs are made of cast aluminum.

12. The RFID antenna of claim 11, wherein the back plate is made of aluminum.

13. The RFID antenna of claim 1, further comprising a plastic housing enclosing the back plate and the antenna elements.

14. The RFID antenna of claim 1, in combination with a read-transmit RFID reader electrically connected to the RFID antenna via the at least one electrical coupling.

15. A method of RFID reader antenna communication, the method comprising:
   sending signals at an RFID frequency through the antenna, from a read transmit RFID reader coupled to the antenna;
   wherein the antenna includes:
   a planar metallic back plate;
   a pair of antenna elements attached to the back plate, wherein the antenna elements each include a pair of antenna prongs, each of the prongs in turn including a pair of prong parts that are attached to the plate, and a tuned electrical element between the prong parts; and
   an electrically coupling for connecting the antenna elements to the read-transmit RFID reader; and
   wherein the antenna provides magnetic coupling at a range greater than 1 wavelength at the RFID frequency.

16. The method of claim 15, wherein the antenna provides magnetic coupling at a range of at least 1 meter, at the RFID frequency.

17. The method of claim 15, wherein the antenna provides magnetic coupling at a range of between 1 to 2 meters, at the RFID frequency.

18. The method of claim 15, wherein the antenna is tuned for operation at the RFID frequency.

19. The method of claim 15, further comprising receiving signals with the antenna from an RFID device, at the RFID frequency.

20. The method of claim 19, wherein the sending and the receiving art parts of an interactive communication between the RFID reader and the RFID device.

* * * * *